United States Patent [19]

Ekiner et al.

[11] Patent Number: 4,983,191

[45] Date of Patent: Jan. 8, 1991

[54] PRODUCTION OF AROMATIC POLYIMIDE MEMBRANES

[75] Inventors: Okan M. Ekiner, Wilmington, Del.; Richard A. Hayes, Parkersburg, W. Va.

[73] Assignees: E. I. Du Pont de Nemours and Company, Wilmington, Del.; L'Air Liquide S.A., Paris Cedex, France

[21] Appl. No.: 418,835

[22] Filed: Oct. 10, 1989

[51] Int. Cl.$^5$ .................. B01D 53/22; B01D 71/64
[52] U.S. Cl. .................................. 55/158; 55/16; 210/500.39; 264/184
[58] Field of Search ............... 55/16, 68, 158; 210/500.39; 264/41, 184

[56] References Cited

U.S. PATENT DOCUMENTS

| | | |
|---|---|---|
| Re. 30,351 | 7/1980 | Hoehn et al. .................. 55/16 |
| 4,080,743 | 3/1978 | Manos .......................... 55/16 X |
| 4,080,744 | 3/1978 | Manos .......................... 55/16 X |
| 4,120,098 | 10/1978 | Manos ...................... 210/500.39 X |
| 4,230,463 | 10/1980 | Henis et al. .................. 55/16 |
| 4,370,290 | 1/1983 | Makino et al. ................ 264/184 |
| 4,378,400 | 3/1983 | Makino et al. ................ 55/158 X |
| 4,432,875 | 2/1984 | Wrasidlo et al. .......... 210/500.39 X |
| 4,440,643 | 4/1984 | Makino et al. ................ 55/158 X |
| 4,474,662 | 10/1984 | Makino et al. ................ 55/158 X |
| 4,474,858 | 10/1984 | Makino et al. ................ 55/158 X |
| 4,485,056 | 11/1984 | Makino et al. ................ 264/41 |
| 4,512,893 | 4/1985 | Makino et al. ................ 55/158 X |
| 4,528,004 | 7/1985 | Makino et al. ................ 55/16 X |
| 4,575,385 | 3/1986 | Brooks et al. ................. 55/158 |
| 4,690,873 | 9/1987 | Makino et al. ................ 55/16 X |
| 4,705,540 | 11/1987 | Hayes .......................... 55/16 |
| 4,717,393 | 1/1988 | Hayes .......................... 55/158 X |
| 4,717,394 | 1/1988 | Hayes .......................... 55/158 X |
| 4,746,474 | 5/1988 | Kohn ........................... 55/16 X |
| 4,830,640 | 5/1989 | Nakamura et al. .............. 55/16 X |
| 4,838,900 | 6/1989 | Hayes .......................... 55/16 |
| 4,857,079 | 8/1989 | Kimura ......................... 55/16 |
| 4,863,496 | 9/1989 | Ekiner et al. .................. 55/158 |
| 4,880,442 | 11/1989 | Hayes .......................... 55/158 X |

FOREIGN PATENT DOCUMENTS

| | | |
|---|---|---|
| 0219878 | 4/1987 | European Pat. Off. ........... 55/158 |
| 60-064602 | 4/1985 | Japan ...................... 210/500.39 |
| 61-133118 | 6/1986 | Japan ........................... 55/158 |
| 62-183837 | 8/1987 | Japan ........................... 55/158 |
| 62-216622 | 9/1987 | Japan ........................... 55/158 |
| 01-080422 | 3/1989 | Japan ........................... 55/158 |
| 01-080423 | 3/1989 | Japan ........................... 55/158 |

OTHER PUBLICATIONS

Cabasso et al., "Research and Development of NS-1 and Related Polysulfone Hollow Fibers for Reverse Osmosis Desalination of Seawater", (NTIS PB-248666, 7/1975).

*Primary Examiner*—Robert Spitzer
*Attorney, Agent, or Firm*—Craig H. Evans

[57] ABSTRACT

A process of producing a polyimide gas separation membranes comprising adding an oligomeric or polymeric aromatic epoxy resin to the dope solution, the resin being soluble in the polyimide or polyamic acid precursor, the solvent and the final membrane and the membrane comprising a blend of the polyimide and the resin.

16 Claims, No Drawings

PRODUCTION OF AROMATIC POLYIMIDE MEMBRANES

FIELD OF INVENTION

This invention relates to an improved aromatic polyimide separating membrane and a process for making it. More particularly, it relates to a process of producing such membranes from a dope solution comprising polymeric base material and an oligomeric or polymeric aromatic epoxy resin in a solvent wherein the epoxy resin is soluble in the solvent, the polymer base material and the final membrane.

BACKGROUND

It is well known that an aromatic polyimide dense film or asymmetric membrane has utility in separating gases. Such polyimide membranes have an imide linkage in the polymer backbone. They are taught in U.S. Patent Re. 30,351, which is incorporated herein by reference. U.S. Pat. No. 4,705,540; U.S. Pat. No. 4,717,394 and co-pending application Ser. No. 07/418,838, which are incorporated herein by reference, disclose preferred polyimide membranes.

The polyimide membranes can be produced by casting films or extruding hollow fibers from dope solution of aromatic polyimide or corresponding polyamic acid precursors in a solvent mixture and evaporating the solvent (or, in the case of the asymmetric membrane, evaporating a portion of the solvent from one side of the film or the hollow fiber and quenching with a nonsolvent). Such processes are taught in the above references as well as U.S. Pat. Nos. 4,370,290; 4,474,662; 4,485,056; and 4,528,004, which are incorporated by reference. In the case of the polyamic acid, cyclizing by a suitable treatment such as the application of heat is needed.

The preferred asymmetric membrane is characterized by a thin skin of polymer supported by a generally cellular structure. The thin skin is preferred since it allows high flux or permeation of gases. Forming a highly permeable membrane also leads to formation of submicroscopic holes which pass gases indiscriminately causing the membrane to have an effective separation value for most pairs of gases which is less than the intrinsic separation value of the polymer from which the membrane is made. Posttreating is typically used to heal the holes.

U.S. Pat. No. 4,370,290 discloses an aromatic polyimide porous fiber produced from a spin dope solution of a polymer material consisting of at least one polyimide in a solvent comprising, as a main component, at least one phenolic compound.

U.S. Pat. No. 4,474,662 discloses an aromatic polyimide porous membrane produced by drying a thin layer of dope solution containing an aromatic polyamic acid in a mixed solvent of polar organic compounds which evaporate at different rates and in which the polyamic acid is soluble to different extents.

U.S. Pat. No. 4,485,056 discloses an aromatic polyimide membrane produced by forming a thin film of a dope solution containing aromatic polyamic acid in a polar organic solvent, coagulating the thin dope solution film in a coagulating liquid containing water and lower aliphatic alcohols, drying the coagulated membrane and heating it to convert it to an aromatic polyimide membrane.

U.S. Pat. No. 4,528,004 discloses an aromatic polyimide porous membrane substrate with at least one surface coated from a dilute solution of aromatic polyimide or polyamic acid dissolved in one or more organic liquids. Prior to applying the dope solution, the porous membrane may be immersed in a treating liquid of at least one member selected from lower aliphatic alcohols, lower aliphatic ketones, benzene-type liquid compounds.

Co-pending patent application Ser. No. 07/418,838 discloses aromatic polyimide membranes compositionally containing phenylindane functions.

It would be desirable, particularly in the case of asymmetric membranes, if processing improvements could be made and if a membrane with fewer defects could be made prior to posttreatment.

SUMMARY OF INvENTION

The present invention relates to the finding that, by adding to the dope (which contains the aromatic polyimide or corresponding polyamic acid precursors in a solvent mixture) certain organic compounds, certain advantages accrue. The resulting unposttreated membrane exhibits a higher selectivity than without the additive and processing, particularly in the case of asymmetric hollow fibers, is made easier.

The organic additives comprise oligomeric or polymeric residues soluble in the base polyimide or polyamic acid precursor, in the solvent mixture under production conditions and in the final membrane. Preferably, they result from the polymerization of a compound of the following structure:

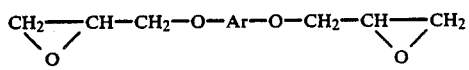

where Ar represents a divalent aromatic group and the resulting repeating units are preferably substituted with halogen atoms at all positions ortho to the glycidyl ether groups.

DETAILS OF INVENTION

The present invention has found utility for membranes composed essentially of polyimide materials, that is, polymers having an imide linkage in their backbone. Such membranes may be dense film, composite or asymmetric with the asymmetric morphology being preferred.

The preferred material composition of these membranes comprise soluble aromatic polyimide materials, heretofore prepared by typical procedures as taught in the prior art, such as U.S. re 30,351. More preferably, the aromatic polyimide compositions incorporate pendant aliphatic side chains. Examples of such compositions are disclosed in, for example, U.S. 4,705,540 and U.S. 4,717,394. Also, they preferably include aromatic polyimides incorporating phenylindane groups. Examples of such are disclosed in co-pending application Ser. No. 07/418,838.

The preferred aromatic polymides for use in the present invention consist essentially of repeating units of the formula

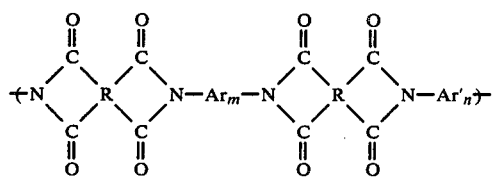

wherein

is selected from the group consisting of

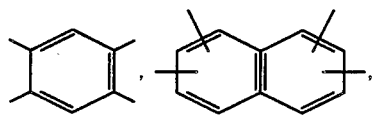

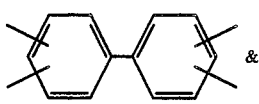

where $R^I$ is

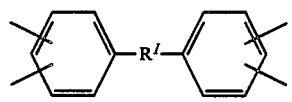

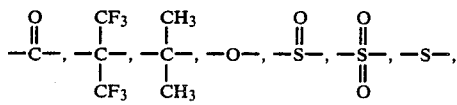

or alkylene groups of 1 to 5 carbon atoms, where —$R^{II}$— is

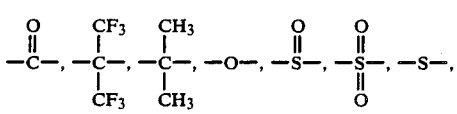

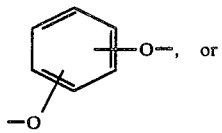

alkylene groups of 1 to 5 carbon atoms; Ar is

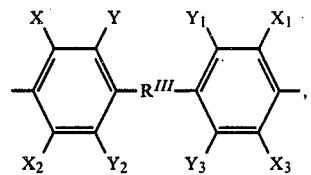

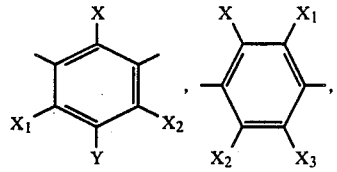

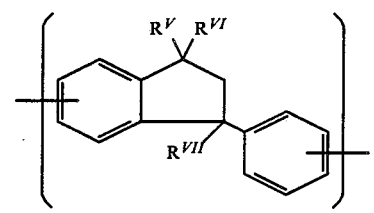

or mixtures thereof, where —$R^{III}$ is

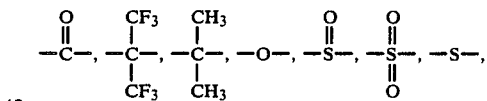

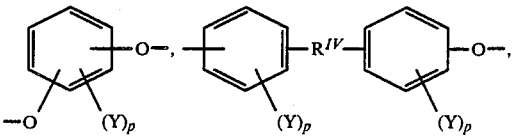

or alkylene groups of 1 to 5 carbon atoms, where —$R^{IV}$—is

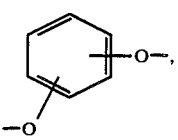

or alkylene groups of 1 to 5 carbon atoms, —X—, —$X_1$—, —$X_2$—, and —$X_3$— independently are alkyl groups of 1 to 5 carbon atoms, alkoxy groups of 1 to 5 carbon atoms, phenyl or phenoxy groups, —Y—, —$Y_1$—, —$Y_2$— and —$Y_3$— independently are —H, —X—, —$X_1$—, —$X_2$—, —$X_3$— or halogen, and where $R^{VI}$, and $R^{VII}$ are independently —H or lower alkyl having from 1 to 6 carbon atoms; —Ar'— is

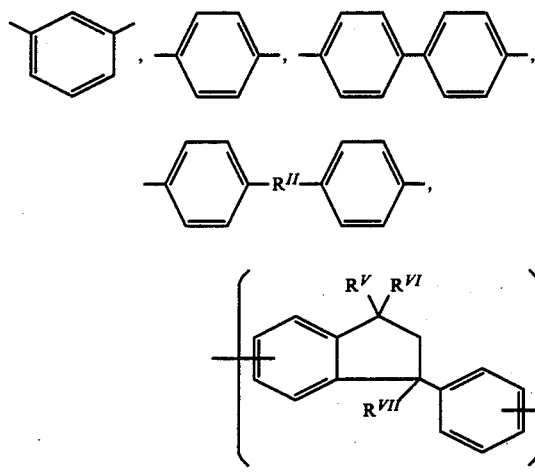

or mixtures thereof where —$R^{II}$—, $R^V$, $R^{VI}$, and $R^{VII}$ have the above-defined meanings, m is 0 to 100% and preferably 20 to 100% of m plus n is 0 to 100% and preferably 20 to 80% and m=100% minus n, and p is 0 to 3.

The gas separations membrane is not limited to any specific type or design. The membrane is preferably asymmetric and more preferably in the form of a hollow fiber. The polymeric membrane may be formed as described in the prior art. For example, they may be of the type described in U.S. Pat No. 4,230,463 or by Cabasso et al in Research and Development of NS-1 and Related Polysulfone Hollow Fibers for Reverse Osmosis Desalination of Seawater (NTIS PB-248666, 7/1975).

The process of this invention for separating one or more gases from a mixture employs gas separation membranes which may be thin dense film membranes or asymmetric membranes having a thin skin on at least one surface thereof. The asymmetric membrane of this invention preferably has a thin skin with a thickness of less than 10,000 Angstroms on one of its surfaces. More preferably, it has a thin skin with a thickness of less than 2,000 Angstroms on one of its surfaces.

The process for preparing the above membranes is modified by the process of this invention by adding oligomeric or polymeric residues ("additive") soluble in the base polyimide or polyamic acid precursor, in the solvent mixture under production conditions and in the final membrane. The additive is not fully extracted from the membrane during the process.

By soluble, it is meant that the additive is soluble in some proportion, that is preferably to at least about 0.5 weight percent. The additive will be considered by one skilled in the art to be soluble if it produces a homogeneous system with the other components in the system.

Preferably, the additives result from the polymerization of a compound of the following structure:

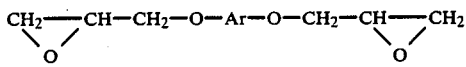

where Ar represents a divalent aromatic group and the resulting repeating units are preferably substituted with halogen atoms, preferably bromine ions, at all positions ortho to the glycidyl ether groups.

The divalent aromatic group is of the form

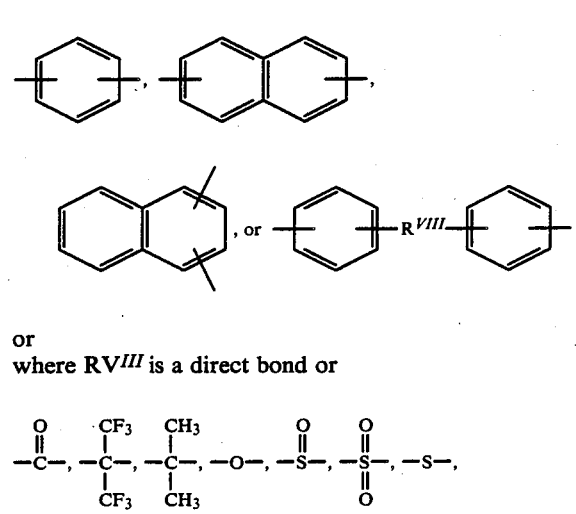

or
where $R^{VIII}$ is a direct bond or

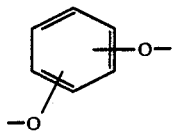

The molecular weight of the additive should be sufficient to allow solubility as heretofore defined. The weight percent based on the base polyimide polymer will depend on the particular polyimide or polyamic acid precursor, the additive and its molecular weight, the solvent and process conditions. The molecular weight and weight percent together preferably will be sufficient to increase selectivity of oxygen over nitrogen at least 5 %, preferably 10%, from the gas pair oxygen/nitrogen (21/79, mole ratio).

The most preferred additive, available commercially from M&T Chemicals, Inc. as "Thermoguard", having n repeating units of the form:

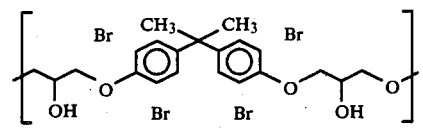

where n is sufficiently large to result in a molecular weight of about 700 to 40,000, preferably 700 to 10,000. With the preferred additive, the preferred weight percent based on base polyimide polymer is 5 to 30 wt. % b.o.p.

EXAMPLES

Reference Examole 1

To a stirred solution of 2,4,6-trimethyl-1,3-phenylene diamine (150.24 g, 1.00 mol) in dimethylsulfoxide (2 L) was added 5,5,-[2,2,2-trifluoro-1-(trifluoromethyl)ethylidene]-1,3- isobenzofurandion (224.22 g. 0.505 mol) and 3,3',4,4'-biphenyltetracarboxlic acid dianhydride (148.58 g, 0.505 mol) under a nitrogen atmosphere at room temperature. The resulting very viscous, orange reaction solution was allowed to stir overnight at room temperature. With rapid stirring, a solution of acetic anhydride (408.4 g, 4.0 mol) and triethylamine (404.8 g, 4.0 mol) was added and the resulting viscous reaction solution allowed to stir at room temperature for 4 hours. The polymer solution was precipitated in water. The resulting white solid was collected by filtration and washed twice with water and methanol. After drying overnight by suction, the polymer was further dried in a vacuum oven (20 inches (51 cm) mercury) at 120° C. for 3 hours and at 250° C. for 5 hours.

Films were cast from a 15% solution of the polymer prepared as described above (based on weight) in N-methylpyrrolidone onto a glass plate treated with Du Pont TEFLON ® dry lubricant at 100° C. with a 15 mil knife gap. The films were dried on the plate at 100° C. for 30 minutes, cooled to room temperature and dried in a vacuum oven (20 inches (51 cm) mercury) at room temperature overnight. The films were removed from the plate and dried in a vacuum oven (20 inches (51 cm) mercury) at 120° C. for 4 hours.

The film, which was 1.3 mils thick, was tested for mixed gas oxygen/nitrogen (21/79, mole) permeabilities at 505 psig, 24° C. Results are reported below:

| $O_2$ Permeability: | 4600 centiBarrer |
|---|---|
| $O_2/N_2$ Selectivity: | 3.6 |

A film prepared as described above, which was 1.6 mils thick, was tested for pure gas nitrogen, helium, and carbon dioxide permeabilities at 600 psig, 600 psig, and 580 psig, respectively, at 25° C. Results are reported below:

| He Permeability: | 23,000 centiBarrer |
|---|---|
| $CO_2$ Permeability: | 65,200 centiBarrer |
| $He/N_2$ Selectivity: | 19 |
| $CO_2/N_2$ Selectivity: | 53. |

$$\text{centiBarrer} = 10^{-12} \times \frac{cm^3(STP) \times cm}{cm^2 \times sec \times cmHg}.$$

Reference Example 2

Films were cast from a solution of 15% wt. of a polymer (prepared similarly to that in Reference Example 1) in N,N-dimethyl acetamide. Films were cast onto a glass plate at 100–110° C. with a 15 mil (3.8×104m) knife gap. Films were dried on the glass at 100–110° C. for at least 20 minutes, the films were then cooled to room temperature. The films while still on the glass plate were dried in a vacuum oven at 100° C. for 48 hours. After cooling to room temperature, the films were carefully stripped from the glass plates.

The films were then tested with mixed gas $O_2/N_2$(21/79)(mole) at approximately 115 psia (792.8 k Pa) and 35° C. Results are reported below:

| $O_2$ Productivity: | 4770 centiBarrer |
|---|---|
| $O_2/N_2$ Selectivity: | 4.07 |
| $O_2$ Productivity: | 4860 centiBarrer |
| $O_2/N_2$ Selectivity: | 4.12 |
| $O_2$ Productivity: | 5090 centiBarrer |
| $O_2/N_2$ Selectivity: | 4.04 |
| $O_2$ Productivity: | 5320 centiBarrer |
| $O_2/N_2$ Selectivity: | 4.13 |
| $O_2$ Productivity: | 5670 centiBarrer |
| $O_2/N_2$ Selectivity: | 4.07 |

Example 1

Films were cast from a solution of 15% wt. solids consisting of a polymer (prepared similarly to that in Reference Example 1) plus 30% wt. b.o.p. (based on polymer) "Thermoguard" 220 (molecular weight M.W. about 700 to 800) in N-methyl pyrrolidone. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 220 psia (1517 k Pa) and 25° C. Results are reported below:

| $O_2$ Productivity: | 2781 centiBarrer |
|---|---|
| $O_2/N_2$ Selectivity: | 5.2 |

Example 2

Films were cast from a solution of 10% wt. of a polymer (prepared similarly to that in Reference Example 1) in Dichloromethane with 10% wt. b.o.p. "Thermoguard" 230 (M.W.=4,000). Upon casting films were covered with a small aluminum pan and allowed to dry overnight. After drying films were stripped from the glass plates and were placed in a vacuum oven and dried at 200° C. for 48 hours. After cooling to room temperature, the films were removed from the vacuum oven.

The films were then tested with mixed gas $O_2/N_2$(21/79) (mole) at approximately 500 psia (3447 k Pa) and 35° C. Results are reported below:

| $O_2$ Productivity: | 3470 centiBarrer |
|---|---|
| $O_2/N_2$ Selectivity: | 4.3 |
| $O_2$ Productivity: | 3360 centiBarrer |
| $O_2/N_2$ Selectivity: | 4.0 |

Example 3

Films were cast from a solution of 10% wt. of a polymer (prepared similarly to that in Reference Example 1) in Dichloromethane with 20% wt. b.o.p. "Thermoguard" 230 (M.W.=4,000). Upon casting films were covered with a small aluminum pan and allowed to dry overnight. After drying films were stripped from the glass plates and were placed in a vacuum oven and dried at 200° C. for 48 hours. After cooling to room temperature, the films were removed from the vacuum oven.

The films were then tested with mixed gas $O_2/N_2$ (21/79) (mole) at approximately 100 psia (689.5 k Pa) and 35° C. Results are reported below:

| $O_2$ Productivity: | 1180 centiBarrer |
|---|---|
| $O_2/N_2$ Selectivity: | 4.3 |
| $O_2$ Productivity: | 1050 centiBarrer |
| $O_2/N_2$ Selectivity: | 4.2 |

Example 4

Films were cast from a solution of 15% wt. solids consisting of a polymer (prepared similarly to that in Reference Example 1) plus 30% wt. b.o.p. "Thermoguard" 230 (M.W.=4,000) in N-methyl pyrrolidone. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 100 psia (689.5 k Pa) and 35° C. Results are reported below:

| | |
|---|---|
| $O_2$ Productivity: | 658 centiBarrer |
| $O_2/N_2$ Selectivity: | 4.2 |

Example 5

Films were cast from a solution of 15% wt. solids consisting of a polymer (prepared similarly to that in Reference Example 1) plus 5% wt., 15% wt. and 30% wt. b.o.p. "Thermoguard" 230H (M.W.=20,000) in N-methyl pyrrolidone. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 100 psia (689.5 k Pa) and 35° C. Results are reported below:

| For 5% wt. "Thermoguard" 230H: | |
|---|---|
| $O_2$ Productivity: | 3050 centiBarrer |
| $O_2/N_2$ Selectivity: | 3.5 |
| For 15% wt. "Thermoguard" 230H: | |
| $O_2$ Productivity: | 2680 centiBarrer |
| $O_2/N_2$ Selectivity: | 3.5 |
| For 30% wt. "Thermoguard" 230H: | |
| $O_2$ Productivity: | 1580 centiBarrer |
| $O_2/N_2$ Selectivity: | 3.9 |

Example 6

Films were cast from a solution of 15% wt. solids consisting of a polymer (prepared similarly to that in Reference Example 1) plus 5% wt., 15% wt. and 30% wt. b.o.p. "Thermoguard" 240 (M.W.=40,000) in N-methyl pyrrolidone. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 235 psia (1620 k Pa) and 25° C. Results are reported below:

| For 5% wt. "Thermoguard" 240: | |
|---|---|
| $O_2$ Productivity: | 3060 centiBarrer |
| $O_2/N_2$ Selectivity: | 3.7 |
| For 15% wt. "Thermoguard" 240: | |
| $O_2$ Productivity: | 2870 centiBarrer |
| $O_2/N_2$ Selectivity: | 3.5 |
| For 30% wt. "Thermoguard" 240: | |
| $O_2$ Productivity: | 2410 centiBarrer |
| $O_2/N_2$ Selectivity: | 3.5 |

Example 7

Films were cast from a solution of 15% wt. solids consisting of a polymer (prepared similarly to that in Reference Example 1) plus "Thermoguard" 240 in N-methyl pyrrolidone at a ratio of 1:1. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 100 psia (689.5 k Pa) and 35° C. Results are reported below:

| | |
|---|---|
| $O_2$ Productivity: | 444 centiBarrer |
| $O_2/N_2$ Selectivity: | 3.5 |

Reference Example 8

Films were cast from a solution of 15% wt. solids consisting of "Matrimid 5218" (commercially available from Ciba Geigy) in N-methyl pyrrolidone. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 500 psia (3447 k Pa) and 25° C. Results are reported below:

| | |
|---|---|
| $O_2$ Productivity: | 134.6 centiBarrer |
| $O_2/N_2$ Selectivity: | 7.12 |
| $O_2$ Productivity: | 140.5 centiBarrer |
| $O_2/N_2$ Selectivity: | 7.11 |
| $O_2$ Productivity: | 132.4 centiBarrer |
| $O_2/N_2$ Selectivity: | 7.19 |

Example 9

Films were cast from a solution of 15% wt. solids consisting of "Matrimid 5218" plus 30% wt. b.o.p. (based on polymer) "Thermoguard" 220 (M.W.=700 to 800), 230 (M.W.=4,000), 230H (M.W.=10,000) and 240 (M.W.=40,000) in N-methyl pyrrolidone. The solution was cast onto a glass plate treated with Du Pont Teflon ® dry lubricant at 100° C. with a 15 mil knife gap. The films were dried on plate at 100° C. for 30 minutes, and dried overnight in a vacuum oven at room temperature. The films were stripped from the glass plates and further dried in a vacuum oven at 120° C. for 4 hours.

The films were then tested with mixed gas $O_2/N_2$ (21/79) (mole) at approximately 235 psia (1620 k Pa) and 25° C. Results are reported below:

| For 30% wt. "Thermoguard" 220: | |
|---|---|
| $O_2$ Productivity: | 22.8 centiBarrer |

| | |
|---|---|
| O₂/N₂ Selectivity: | 7.76 |
| For 30% wt. "Thermoguard" 230: | |
| O₂ Productivity: | 199 centiBarrer |
| O₂/N₂ Selectivity: | 6.49 |
| For 30% wt. "Thermoguard" 230H: | |
| O₂ Productivity: | 151 centiBarrer |
| O₂/N₂ Selectivity: | 6.72 |
| For 30% wt. "Thermoguard" 240: | |
| O₂ Productivity: | 83.6 centiBarrer |
| O₂/N₂ Selectivity: | 7.71 |

Example 10

This example describes the preparation and processes therein of asymmetric hollow fiber membranes from "Matrimid 5218" polyimide. The hollow fiber membranes are spun from a hollow fiber spinnerette into a water coagulant as has been taught in the prior art. For example, they may be of the type described in U.S. Pat. No. 4,230,463 or of Cabasso et al in Research and Development of NS-1 and Related Polysulfone Hollow Fibers for Reverse Osmosis Desalination of Seawater (NTIS PB-248666, 7/1975).

A polymer solution was prepared with 27 wt. % solids content of "Matrimid 5218" and 20 wt. % b.o.p. of "Thermoguard" 230 in N-methyl pyrrolidone.

The above polymer solution was extruded through a hollow fiber spinnerette with fiber channel dimensions of outer diameter (OD) equal to 21 mils (533 microns) and inner diameter (ID) equal to 10 mils (254 microns) at the rate of 130 cc per hour at 100° C. A solution of 85 volume % N-methylpyrrolidone in water was injected into the fiber bore at a rate of 60 cc per hour. The spun fiber passed through an air gap of 10.0 cm at room temperature into a water coagulant bath maintained at 22° C. The fiber was wound up on a drum at the rate of 100 meters per minute.

The water-wet fiber was dehydrated as taught in U.S. Pat. Nos. 4,080,743; 4,080,744; 4,120,098; and EPO 219,878. This specifically involved the sequential replacement of water with methanol, the replacement of methanol with "Freon 113" (1,1,2-trichloro-1,2,2-trifluoroethane), and air-drying. The dry fibers were cut into lengths of approximately 20 inches (0.51 m) long and the open ends of the fibers were potted in an epoxy resin within a ¼-inch (0.00635 m) diameter stainless steel tube to provide loops approximately 9 inches (0.23 m) long. From 10 to 24 fibers were so potted for the individual tests.

An asymmetric hollow fiber, prepared as described above, was tested for mixed gas oxygen/nitrogen permeabilities at 100 psig (689 kPa), room temperature. Results are reported below:

| | |
|---|---|
| O₂ Productivity: | 25 GPU |
| O₂/N₂ Selectivity: | 6.2 |

$$GPU = 10^{-6} \times \frac{cm^3(STP)}{cm^2 \times sec \times cmHg}$$

The outer surfaces of the membrane were contacted with hexane at room temperature for 0.25 hour at a vacuum of 20 inches mercury in the fiber bore. The hexane was drained and the membrane allowed to air-dry.

The asymmetric membrane treated as above was tested for mixed gas oxygen/nitrogen permeabilities at 100 psig (689 kPa), room temperature. Results are reported below:

| | |
|---|---|
| O₂ Productivity: | 10 GPU |
| O₂/N₂ Selectivity: | 6.8 |

Example 11

Hollow fine fibers of a polymer (prepared similarly to that in Reference Example 1) were spun using the procedure of Example 10 except that the bore fluid composition was 80% by volume dimethylacetamide/dimethylsulfoxide (DMAC/DMSO) in water used at a feed rate of 67. cm³/hr. The polymer spinning solution consisted of 22% of the polymer, 20% wt. b.o.p. "Thermoguard" T-230, 20% wt. b.o.p. tetramethylsulfone (TMS) and 6% wt. b.o.p. acetic anhydride in 1:1 DMAC/DMSO.

Repeated spinning operations were conducted and gave results as follows:

| Run | Spinneret Temp. | Air Gap | Take-up Speed | k O₂ | O₂/N₂ |
|---|---|---|---|---|---|
| F | 105° C. | 5 cm | 50 M/min | 82 GPU | 4.4 |
| G | 105° C. | 2.5 cm | 50 M/min | 113 GPU | 4.5 |
| H | 105° C. | 1 cm | 50 M/min | 148 GPU | 4.2 |

Control Example 1

For control purposes the following comparative procedures were performed under similar conditions to Example 11 using a polymer solution feed rate of 105 cm³/hr and a bore fluid composition of 85% by volume DMAC/DMSO in water used at a feed rate of 60 cm³/hr. The polymer spinning solution consisted of 21% the polymer, 20% wt. b.o.p. lithium nitrate and 20% wt. b.o.p. TMS in 1:1 DMAC/DMSO.

Results were as follows:

| Run | Spinneret Temp. | Air Gap | Take-up Speed | k O₂ | O₂/N₂ |
|---|---|---|---|---|---|
| Comp I | 105° C. | 5 cm | 50 M/min | 145 GPU | 3.7 |
| Comp J | 105° C. | 2.5 cm | 50 M/min | 150 GPU | 3.6 |
| Comp K | 105° C. | 1 cm | 50 M/min | 195 GPU | 2.4 |

We claim:

1. An improved process for making gas separation membranes of aromatic polymers having imide linkages in their backbone from a dope solution of an aromatic polyimide or a polyamic acid precursor to said aromatic polyimide in a solvent, wherein the improvement comprises adding sufficient oligomeric or polymeric residue of a sufficient molecular weight to the dope solution, said residue being soluble in the aromatic polyimide or polyamic precursor and solvent under process conditions and in the produced gas separation membrane, said residue not being totally extracted from membrane during the process.

2. The process of claim 1 wherein the oligomeric or polymeric residue is the polymerization product of a compound of the following structure:

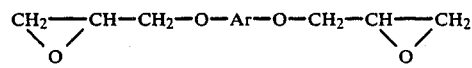

where Ar represents a divalent aromatic group of the form

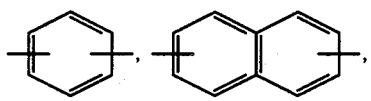

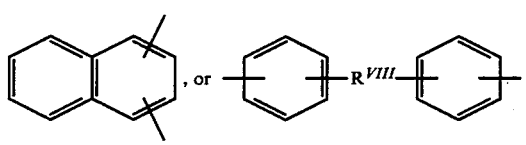

or where $R^{VIII}$ is a direct bond or

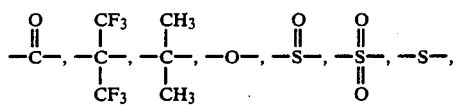

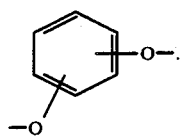

3. The process of claim 2 wherein the resulting repeating units are substituted with halogen atoms at all positions ortho to the glycidyl ether groups.

4. The process of claim 3 wherein the halogen atoms are bromine atoms.

5. The process of claim 4 wherein the oligomeric or polymeric residue has n repeating units of the form:

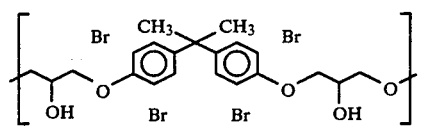

where n is sufficient for the molecular weight of the oligomeric or polymeric residue to be about 700 to 40,000.

6. The process of claim 5 wherein the molecular weight is about 700 to 10,000.

7. The process of claim 5 wherein the weight percent based on the polyimide or polyamic precursor in the dope is about 5% to 30%.

8. The process of claims 1 or 2 wherein the polyimide consists essentially of repeating units of the formula

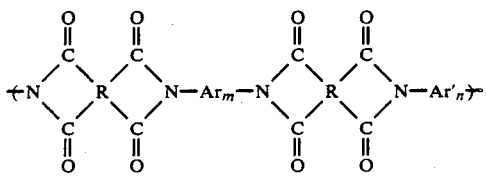

wherein

is selected from the group consisting of

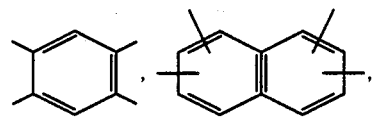

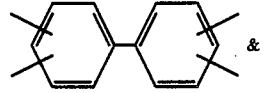

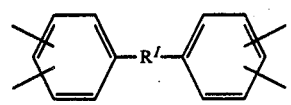

where $R^I$ is

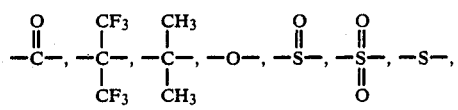

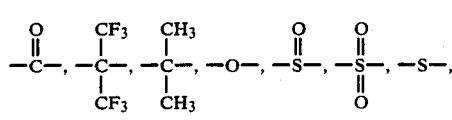

or alkylene groups of 1 to 5 to carbon atoms, where $-R^{II}-$ is

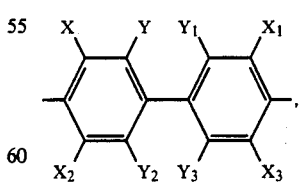

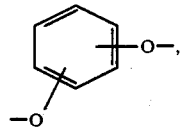

or alkylene groups of 1 to 5 carbon atoms; Ar is

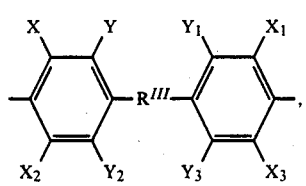

-continued

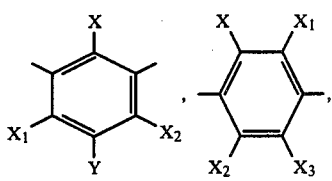

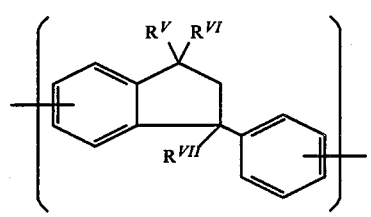

or mixtures thereof, where —$R^{III}$ is

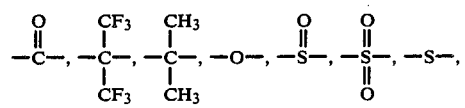

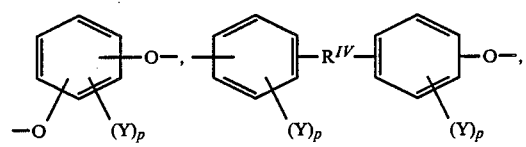

or alkylene groups 1 to 5 carbon atoms, where —$R^{IV}$—is

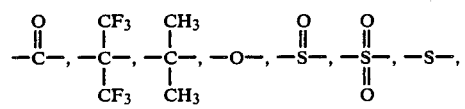

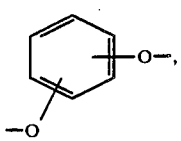

or alkylene groups of 1 or 5 carbon atoms, —X—, —$X_1$—, —$X_2$—, and —$X_3$— independently are alkyl groups of 1 to 5 carbon atoms, alkoxy groups of 1 to 5 carbon atoms, phenyl or phenoxy groups, —Y—, —$Y_1$—, —$Y_2$—, and —$Y_3$—independently are —H, —X—, —$X_1$—, —$X_2$—, —$X_3$— or halogen, and where $R^V$, $R^{VI}$, and $R^{VII}$ are independently —H or lower alkyl having from 1 to 6 carbon atoms; —Ar'— are

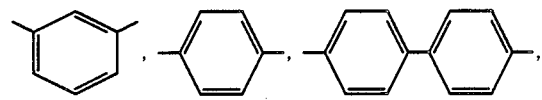

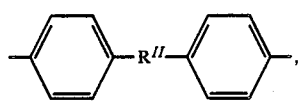

-continued

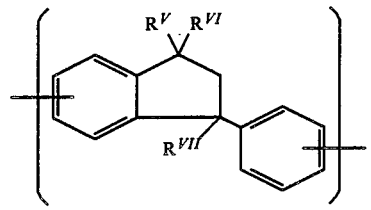

or mixtures thereof where —$R^{II}$—, $R^V$, and $R^{VII}$ have the above-defined meanings, m is 0 to 100% and preferably 20 to 100% of m plus n is 0 to 100% and preferably 20 to 80% and m=100% minus n, and p is 0 to 3.

9. A gas separation membrane comprising a blend of an aromatic polymer having an imide linkage in its backbone and sufficient oligomeric or polymeric residue of a sufficient molecular weight, said residue being soluble in the gas separation membrane.

10. The gas separation membrane of claim 9 wherein the oligomeric or polymeric residue is the polymerization product of a compound of the following structure:

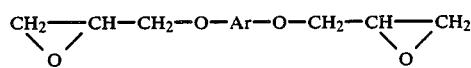

where Ar represents a divalent aromatic group of the form

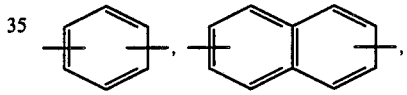

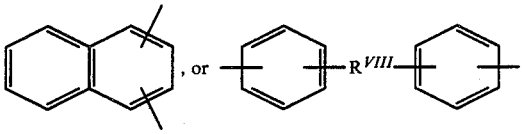

or where $R^{VIII}$ is a direct bond or

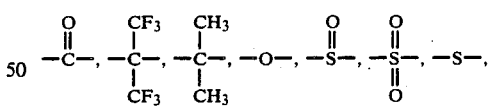

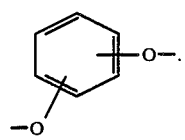

11. The gas separation membrane of claim 10 wherein the resulting repeating units are substituted with halogen atoms at all positions ortho to the glycidyl ether groups.

12. The membrane of claim 11 wherein the halogen atoms are bromine atoms.

13. The membrane of claim 12 wherein the oligomeric or polymeric residue has n repeating units of the form:

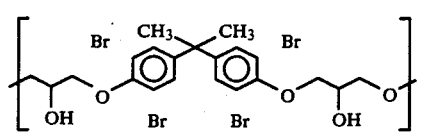

where n is sufficient for the molecular weight of the oligomeric or polymeric residue to be about 700 to 40,000.

14. The membrane of claim 13 wherein the molecular weight is about 700 to 10,000.

15. The membrane of claim 14 wherein the weight percent based on the aromatic polyimide is about 5% to 30%.

16. The membrane of claim 9 or 10 wherein the polyimide consists essentially of repeating units of the formula

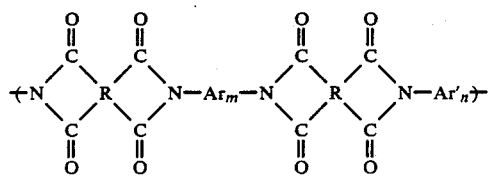

wherein

is selected from the group consisting of

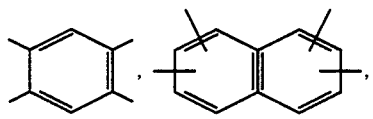

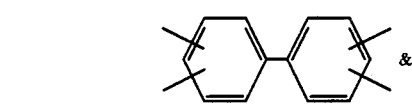

where $R^I$ is

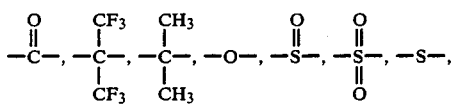

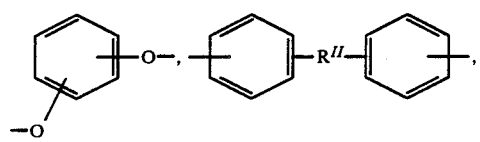

or alkylene groups of 1 to 5 carbon atoms, where $-R^{II}-$ is

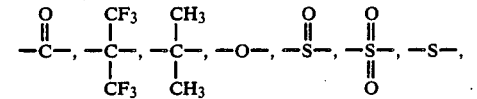

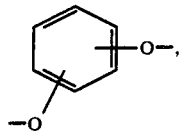

or alkylene groups of 1 or 5 carbon atoms; Ar is

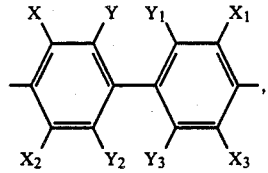

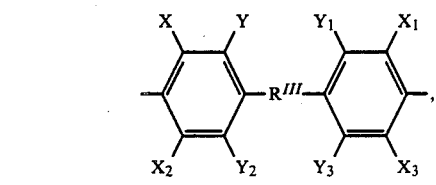

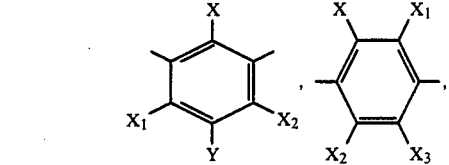

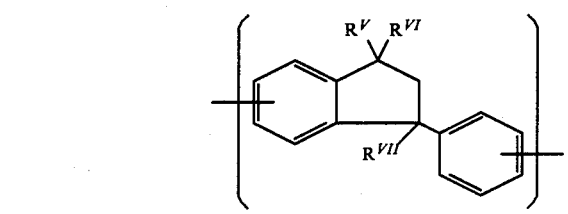

or mixtures thereof, where $-R^{III}$ is

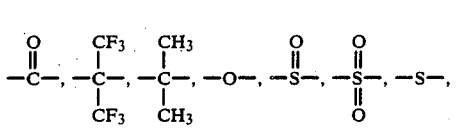

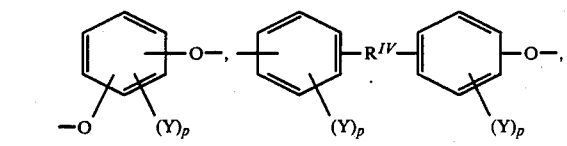

or alkylene groups of 1 to 5 to carbon atoms, where $-R^{IV}-$ is

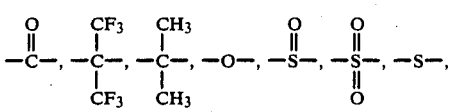

-continued

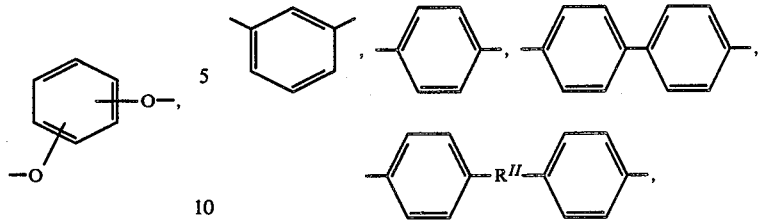

or alkylene groups of 1 to 5 carbon atoms, —X—, —$X_1$—, —$X_2$—, and —$X_3$— independently are alkyl groups of 1 to 5 carbon atoms, alkoxy groups of 1 to 5 carbon atoms, phenyl or phenoxy groups, —Y—, —$Y_1$—, —$Y_2$— and —$Y_3$— independently are —H, —X—, —$X_1$—, —$X_2$—, —$X_3$— or halogen, and where $R^V$, $R^{VI}$, and $R^{VII}$ are independently —H or lower alkyl having from 1 to 6 carbon atoms; —Ar'— is or mixture thereof where —$R^{II}$—, $R^V$, $R^{VI}$, and $R^{VII}$ have the above-defined meanings, m is 0 to 100% and preferably 20 to 100% of m plus n is 0 to 100% and preferably 20 to 80% and m=100% minus n, and p is 0 to 3.

* * * * *

UNITED STATES PATENT AND TRADEMARK OFFICE
CERTIFICATE OF CORRECTION

PATENT NO.  : 4,983,191
DATED       : Jan. 8, 1991
INVENTOR(S) : Okan M. Ekiner and Richard A. Hayes It is certified that error appears in the above-identified patent and that said Letters Patent is hereby corrected as shown below:

Column 15, diagram appearing between lines 25-30 and Column 18, diagram appearing between lines 55-60 should be as follows:

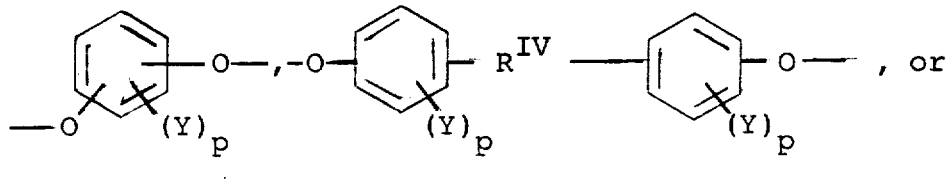

Column 16, line 12, replace "$R^V$, and $R^{VII}$" with
--$R^V$, $R^{VI}$ and $R^{VII}$--.
Column 18, line 13, replace "1 or 5" with --1 to 5--.
Column 18, line 61, replace "1 to 5 to" with --1 to 5--.

Signed and Sealed this

Twenty-third Day of June, 1992

Attest:

DOUGLAS B. COMER

Attesting Officer        Acting Commissioner of Patents and Trademarks